Patented Jan. 11, 1944

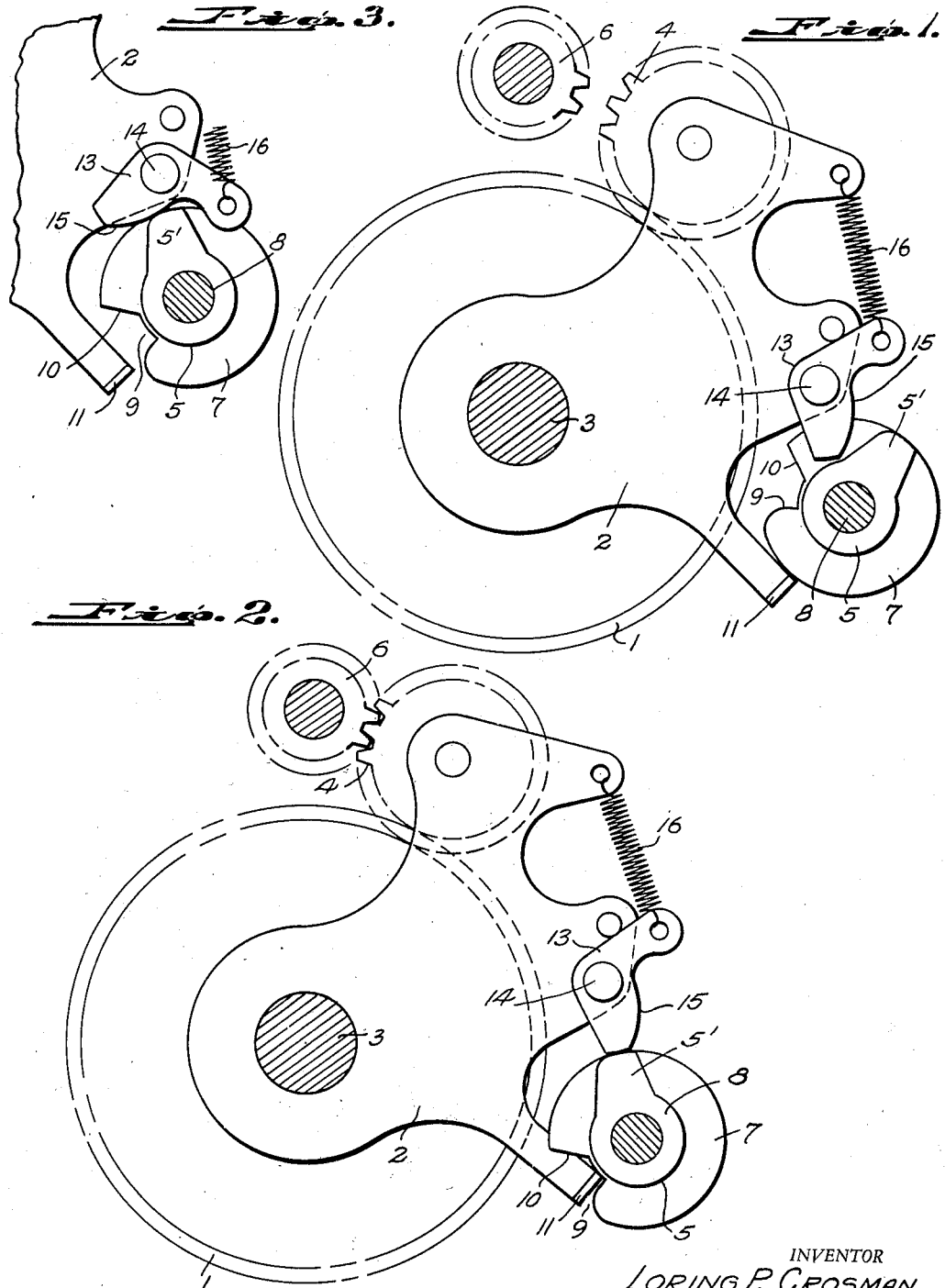

2,339,154

UNITED STATES PATENT OFFICE 2,339,154

TRANSMISSION MECHANISM

Loring Pickering Crosman, South Orange, N. J., assignor to Monroe Calculating Machine Company, Orange, N. J., a corporation of Delaware Application June 3, 1943, Serial No. 489,521

4 Claims. (Cl. 74—405)

The invention relates to transmission mechanism, and particularly to means for displacing a gear wheel into and out of mesh with another gear wheel to establish a drive engagement therewith. An object of the invention is to provide improved means including a manipulable device for displacing one of the gears towards and resiliently meshing the teeth thereof with those of the other gear and for locking the gear against displacement from meshed position. Other objects and advantages will appear hereinafter or will be obvious.

The invention consists in the novel construction and combinations of parts as hereinafter set forth in the claims.

In the accompanying drawing:

Figure 1 is a side view of the invention with the parts in normal position.

Figure 2 is a view similar to Figure 1, with the gear locked in displaced position.

Figure 3 is a detail fragmentary view showing the parts in the positions assumed after the tensioning of the spring connection.

In the drawing, the numeral 1 designates a sun gear, 2 a frame pivoted upon the shaft 3 of said sun gear and whereon a planet gear 4 is mounted, means described as follows and including a manipulable device 5 being provided for locking the frame 2 and the planet gear against displacement from normal position; for disabling the locking means and displacing the frame and the planet gear towards and resiliently meshing the teeth of the planet gear with those of a third gear 6, which may for instance be the driver; for locking the planet gear against displacement from meshed position, and for disabling the last-named locking means, restoring the frame and the planet gear to normal position and rendering again effective the first-named locking means.

The manipulable rotary device 5 is provided with a radial tooth 5' and a circumferential flange 7 the outer edge of which is concentric with the longitudinal axis of the shaft 8 of said device, said flange having a notch 9 provided with a cam edge 10 and said frame 2 having an extension 11 normally riding upon said circumferential flange to lock the frame 2 and the planet gear against displacement.

A lever 13 is fulcrumed at 14 upon said frame, one arm of said lever having a cam edge 15 and the tail arm of said lever having a spring connection 16 with said frame. In counterclockwise manipulation of the rotary device 5, the radial tooth 5' thereof will engage the cam edge of and actuate the lever 13 to tension said spring connection 16, the extension 11 meanwhile riding upon the circumferential flange 7, this tensioning of the spring being completed upon arrival of the notch 9 opposite the extension 11 (Figure 3), whereupon the aforesaid locking of the frame 2 and the planet gear against displacement from normal position will become disabled, the lever 13 being at this time actuated reversely by said tensioned spring connection and the cam edge lever engagement with said tooth being effective to displace the frame 2 and the planet gear towards and to resiliently mesh the teeth of the planet gear with those of the third gear 6, said lever having finally locking engagement with said tooth (Figure 2), to lock the planet gear against displacement from meshed position. In this displacement of the frame 2, the extension 11 thereof will engage or be received within said notch 9.

The cam arm of the lever 13 and the radial tooth 5' of the manipulable device may be considered as the bars or members of a toggle joint, whereof the knuckle is the rolling contact of said arm and said tooth, the end pivot 8 being held against displacement and the other end pivot 14 being displacable when these toggle bars or members are moved towards alignment with each other and with said end pivots in the manipulation of the rotary device 5 and the displacement of the frame 2 in effecting said locking engagement. This alignment and locking engagement are retained against casual disturbance due to the fact that the engaged terminal edges of the aligned lever arm and radial tooth are both somewhat flattened.

In further manipulation of the rotary device in the same counterclockwise direction, the locking engagement of the tooth 5' with the cam arm of the lever 13 will become disabled, and thereafter the cam edge 10 of the notch 9 will engage the extension 11 to restore the frame 2 and the planet gear to normal position and to render again effective the first named locking means constituted by the riding of said extension 11 upon said circumferential flange.

In the displacement of the frame 2 and the planet gear towards the third or driver gear, should the teeth of the one gear clash with those of the other the lever 13 will yield against the tension of its spring connection 16 with the frame 2, until the teeth come into meshing position, whereupon the meshing engagement of the teeth will be completed.

I claim:

1. In transmission mechanism, the combination with two gears one of which is displaceable to establish a drive engagement with the other; of means for displacing the one gear towards and resiliently meshing the teeth thereof with those of the other gear and for locking the gear against displacement from meshed position including a displaceable frame whereon the one gear is mounted, a resilient device mounted upon said frame and a manipulable device directly engaging said resilient device to displace said frame and lock the gear against displacement from meshed position through the medium of said resilient device.

2. In transmission mechanism, the combination with two gears one of which is displaceable to establish a drive engagement with the other; of means for locking the one gear against displacement from normal position, for disabling the locking means and displacing the one gear towards and resiliently meshing the teeth thereof with those of the other gear, for locking the gear against displacement from meshed position and for disabling the last named locking means, restoring the gear to normal position and rendering again effective the first named locking means including a displaceable frame whereon the one gear is mounted, a resilient device mounted upon said frame and a manipulable device engaging said resilient device or alternatively engaging said frame.

3. In transmission mechanism, the combination with two gears one of which is displacable to establish a drive engagement with the other; of means for displacing the one gear towards and resiliently meshing the teeth thereof with those of the other gear and for locking the gear against displacement from meshed position including a displacaceable frame whereon the one gear is mounted, a manipulable rotary device having a radial tooth, and a lever fulcrumed upon said frame, having a cam arm, and a tail arm having spring connection with said frame, said tooth in the manipulation of said rotary device engaging said lever to first tension said spring connection, said lever through the action of said tensioned spring connection having cam engagement with said tooth to displace said frame and thereafter locking engagement with said tooth.

4. In transmission mechanism, the combination with two gears one of which is displaceable to establish a drive engagement with the other; of means for locking the one gear against displacement from normal position, for disabling the locking means and displacing the one gear towards and resiliently meshing the teeth thereof with those of the other gear, for locking the gear against displacement from meshed position and for disabling the last-named locking means, restoring the gear to normal position and rendering again effective the first named locking means including a displaceable frame whereon one gear is mounted, a manipulable rotary device having a circumferential flange and a radial tooth, said flange having a notch provided with a cam edge, said frame having an extension normally riding upon said flange, and a lever fulcrumed upon said frame, having a cam arm, and a tail arm having spring connection with said frame, said tooth in the manipulation of said rotary device engaging said lever to first tension said spring connection, said lever through the action of said tensioned spring connection having cam engagement with said tooth to displace said frame and thereafter locking engagement with said tooth, said tooth in further manipulation of said rotary device disabling said locking engagement and said cam edge engaging said extension to restore said frame and the gear to normal position and to restore the circumferential flange engagement with said extension.

LORING PICKERING CROSMAN.